United States Patent [19]

Antoni et al.

[11] 3,887,162
[45] June 3, 1975

[54] GLANDLESS SOLENOID VALVE FOR CORROSIVE MEDIA

[75] Inventors: Heinz Antoni, Leopoldshafen; Carl Hans Leichsenring, Graben-Neudorf, both of Germany

[73] Assignee: Gesellschaft für Kernforschung mbH, Karlsruhe, Germany

[22] Filed: May 14, 1973

[21] Appl. No.: 360,007

[30] Foreign Application Priority Data

May 26, 1972 Germany............................ 2225689

[52] U.S. Cl. ................. 251/129; 251/141; 251/368
[51] Int. Cl............................................. F16k 31/06
[58] Field of Search...................... 251/141, 129, 368

[56] References Cited
UNITED STATES PATENTS

| 3,391,901 | 7/1968 | Wheeler et al. | 251/368 X |
|---|---|---|---|
| 3,471,119 | 10/1969 | Risk | 251/129 X |
| 3,578,284 | 5/1971 | Martini | 251/129 X |
| 3,670,768 | 6/1972 | Griswold | 251/141 X |

Primary Examiner—Arnold Rosenthal
Attorney, Agent, or Firm—Spencer & Kaye

[57] ABSTRACT

A solenoid valve includes a carrier which is slidably mounted in a valve sleeve and which has an entirely closed first chamber and an adjacent second chamber. A tube attached to the carrier and passing through the first chamber, maintains continuous communication between the second chamber and the interior of the sleeve. The first chamber accommodates a solenoid armature; the second chamber houses a valve ball. Behind the valve ball the second chamber is in continuous communication with a space containing a valve seat. The second chamber has a wall portion which defines an opening oriented towards the valve seat and which retains the valve ball that partially projects through the opening for cooperation with the valve seat. The valve ball is urged against the wall portion by a spring.

6 Claims, 1 Drawing Figure

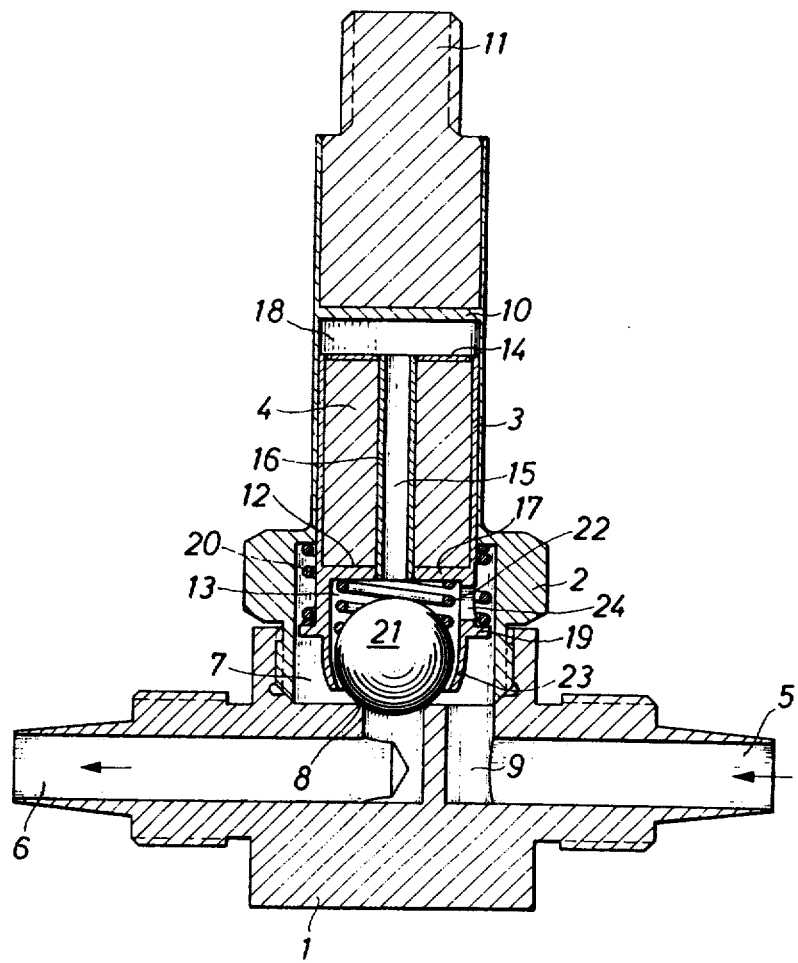

GLANDLESS SOLENOID VALVE FOR CORROSIVE MEDIA

BACKGROUND OF THE INVENTION

The present invention relates to a glandless solenoid valve for aggressive (corrosive) media, consisting of a valve body for the inner valve chamber and a hollow sleeve tightly connected with the latter and surrounded by the solenoid winding to accommodate the solenoid armature carrier moving within said sleeve and incorporating the closing element for the inlet or outlet aperture.

Because of their fluid tight casing, these glandless valves, whose activation mechanism needs no penetration to the outside, are used preferably in nuclear facilities. The requirements to be fulfilled with respect to fluid tight properties are supplemented by further requirements with respect to radiation resistance and corrosion resistance. Valves used in reprocessing facilities for spent nuclear fuels must be acid-proof and, in addition, ensure high reliability over prolonged periods of time while being intensitive to pollution. However, these conditions are difficult to meet in conventional valves, because the cores of ferritic material, which must contact the medium to be shut off as a consequence of the equalization of pressures, will dissolve, e.g., in highly concentrated nitric acid. The application of acid-proof core materials is impossible because, on the one hand, acid-proof austenitic materials cannot be magnetized and, on the other hand, ferritic but high alloyed corrosion resistant grades of steel can exhibit a remagnetzing effect after many operating cycles which could impair the safe functioning of the valve. In order to safely prevent the solenoid magnets from sticking, ferritic soft iron cores are required as far as the magnetic properties are concerned, because the valves operated in highly radioactive plants can be exchanged only under great difficulties and in a very expensive procedure.

SUMMARY OF THE INVENTION

On the basis of these problems the present invention is intended to provide a valve with a ferritic soft iron core which is sufficiently resistant also when used in strongly corrosive media, such as highly concentrated nitric acid, and has a reliability sufficiently high to allow its use in radioactive plants.

According to the present invention, the solenoid armature carrier is shaped like a double pot with two chambers. One chamber which faces the magnet and is completely encased, contains the solenoid armature penetrated by a tube, the wall of which is tightly connected with the carrier and connects the other chamber of the carrier with the interior of a sleeve nut outside of the carrier. Further, the last-named chamber of the carrier contains a ball which protrudes from an aperture and which is pressed by a spring from the inside against the wall of the pot narrowed to form a ball support. Connecting openings behind the ball extend through the wall of the pot into the interior of the valve. In a valve of this design, the valve body, the sleeve and the solenoid armature carrier can preferably be made of acid-proof material, while the encased magnet armature is made of a magnetic material, preferably soft iron. The sealing element proper of this valve is preferably constituted by a ball of synthetic ruby. This valve design makes it possible to entirely encase the magnet armature proper, while the magnetic properties of a glandless solenoid valve are retained. Further, the valve to be completely flooded with the corrosive medium may be controlled. In a preferred embodiment, pressures between the top and the bottom sides are equalized during actuation of the magnet by the tube penetrating through the solenoid armature carrier and the armature, which tube is made of the same acid-proof material as the carrier.

BRIEF DESCRIPTION OF THE DRAWING

The sole FIGURE illustrates a preferred embodiment in longitudinal section.

DESCRIPTION OF THE PREFERRED EMBODIMENT

Turning now to the FIGURE, there is shown a valve body 1 the top of which is tightly screwed to a hollow sleeve nut 2. The valve body 1 and the sleeve 2 enclose an inner space 7 which is connected with the inlet and outlet apertures 5 and 6, respectively, as connections of the valve via the valve seat 8 and the inlet aperture 9. The upper part of the sleeve 2 which is sealed by a partition 10 from the inner space 7 and the medium to be controlled, accommodates a solenoid core 11 which constitutes one part of the switching magnet. The solenoid winding, which is not shown here, is arranged outside and around the sleeve 2. In the interior of the sleeve 2, which corresponds to a circular cylindrical bore, the circular cylindrical solenoid armature carrier 3 moves with a minimum of clearance. This solenoid armature carrier 3 is shaped like a double pot with two chambers 12 and 13. The upper chamber 12 of the carrier 3 closed towards the outside by the cover 14 contains the solenoid armature 4. The solenoid armature 4 is penetrated by a bore 15 connecting the lower chamber of the pot 13 with the upper part 18 of the inner space 7. The bore 15 is closed with respect to the solenoid armature 4 by a tube 16 which is tightly welded onto the cover 14 and the partition 17 of the pot. Hence, this bore 15 effects a connection between the top and the bottom sides of the magnet which, however, cannot contact the medium to be controlled. The lower part of the carrier 3 is equipped with a projection 19 by which the carrier 3 is supported on the sleeve 2 with the interposition of a helical coil spring 20. This continuously presses the carrier 3 against the valve seat 8 as long as the solenoid remains de-energized. The lower chamber 13 of the carrier 3 holds the closing element of cooperating with the valve seat 8. It consists of a ball 21 supported on the partition 17 by spring 22. The ball 21 is prevented from escaping from the chamber 13 by the rolled-in lower wall 23 of the pot. However, the ball 21 protrudes from the chamber 13 and is forced into the valve seat 8 of the discharge 6 by the two springs 20 and 22.

In order to ensure a more rapid equalization of pressures between the spaces 7 and 18 through the bore 15, as the carrier 3 is moved, the wall of the lower chamber 13 of the pot is equipped with a bore 24 through which the medium to be controlled can flow out and upwardly in the space 7.

In the valve described herein, all parts with the exception of the ball 21 and the solenoid armature 4 are made of acid-proof material. The completely encased armature 4 may consist of ferritic soft iron and may be designed only in the light of its magnetic characteristics. The ball 21 may be made of synthetic ruby, which is a well known sealing material to be used on steel, known for its long life and its small amount of wear in aggressive media. The freely moving spring action holding down mechanism of the ball is necessary for accurate centering of the valve seat. In addition, this allows the ball to turn, which has a favorable influence upon the wear of the ball. The diameter of the bore 15 may be approximately 2-5 mm with a diameter of approximately 15 mm of sleeve 2. The aperture 24 and the annular space between the projection 19 and the partition of the inner space 7 at the sleeve 2 may have the corresponding or larger cross sections. In this way, sufficient free flow cross section is available so that the exchange of media between spaces 7 and 18 will not be receded even if the valve components become soiled. This design allows even small solid particles to float in the valve without blocking the valve body.

The valve according to the present invention is particularly suitable for application in nuclear facilities under strong ionizing radiation and highly aggressive media. In particular the insensitivity to soiling and the complete encasing of the magnet core ensures a long life with an optimum operational readiness.

We claim:

1. A solenoid valve, including a valve body having means defining an inlet, an outlet and a valve seat disposed therebetween; a hollow sleeve attached to said valve body and extending therefrom; a solenoid winding surrounding the sleeve; a solenoid core accommodated in the sleeve at a location remote from the valve body; a solenoid armature movable within the sleeve; and a valve ball cooperating with the valve seat and actuated by the armature; the improvement comprising
   a. a carrier slidably received in said sleeve for movement towards and away from said core, said carrier including
      1. means defining an entirely closed first chamber adjacent said solenoid core, said solenoid armature being disposed entirely in said first chamber;
      2. means defining a second chamber adjacent said valve seat, said valve ball being disposed in said second chamber;
      3. wall means defining an opening in said second chamber, said opening being oriented towards said valve seat, said wall means retaining said valve ball in said second chamber;
      4. a tube affixed to said means defining said first chamber, said tube maintaining communication between said second chamber and an interior part of said sleeve, said interior part being situated externally of said carrier and adjacent said first chamber;
      5. means defining, behind said valve ball, a connecting opening in said means defining said second chamber for maintaining a continuous communication between said second chamber and an inner space in said valve body adjacent said valve seat; and
   b. spring means disposed in said second chamber for urging said valve ball into retaining engagement with said wall means, said valve ball having a portion protruding outwardly from said second chamber to cooperate with said valve seat.

2. A solenoid valve as defined in claim 1, wherein said valve body, said sleeve and said carrier are made of an acid-proof material.

3. A solenoid valve as defined in claim 2, wherein said armature is made of a magnetic material.

4. A solenoid valve as defined in claim 3, wherein said magnetic material is soft iron.

5. A solenoid valve as defined in claim 1, wherein said valve ball is made of synthetic ruby.

6. A solenoid valve as defined in claim 1, further comprising an additional spring means for continuously urging said carrier towards said valve seat.

* * * * *